No. 790,977. PATENTED MAY 30, 1905.
C. C. PECK.
METAL PIPE JOINT.
APPLICATION FILED JULY 11, 1904.

WITNESSES.
William H. Whitmore,
Charles L. Whitmore.

INVENTOR
Cassius Carroll Peck

No. 790,977. Patented May 30, 1905.

UNITED STATES PATENT OFFICE.

CASSIUS CARROLL PECK, OF ROCHESTER, NEW YORK.

METAL-PIPE JOINT.

SPECIFICATION forming part of Letters Patent No. 790,977, dated May 30, 1905.

Application filed July 11, 1904. Serial No. 216,081.

*To all whom it may concern:*

Be it known that I, CASSIUS CARROLL PECK, residing at Rochester, in the county of Monroe and State of New York, have invented a certain new and useful Improvement in Metal-Pipe Joints, of which the following is a specification sufficient to enable others skilled in the art to which it appertains to make and use the same.

My invention applies to various kinds of metal pipes, but is more especially designed for cast-metal pipes, as with such pipes the parts of the joint are made integral with the pipe, while with wrought-metal pipes the joint parts are made separate and attached to the pipe.

The principal object sought and attained is provision for linear expansion of the pipe while maintaining a tight and durable joint.

A line of piping employing my improved joint requires no special expansion-joints; and it is one of the chief objects of my invention to avoid the necessity for use of this expensive and troublesome form of joint.

In the accompanying drawings like parts are represented by the same characters.

Figure 1:
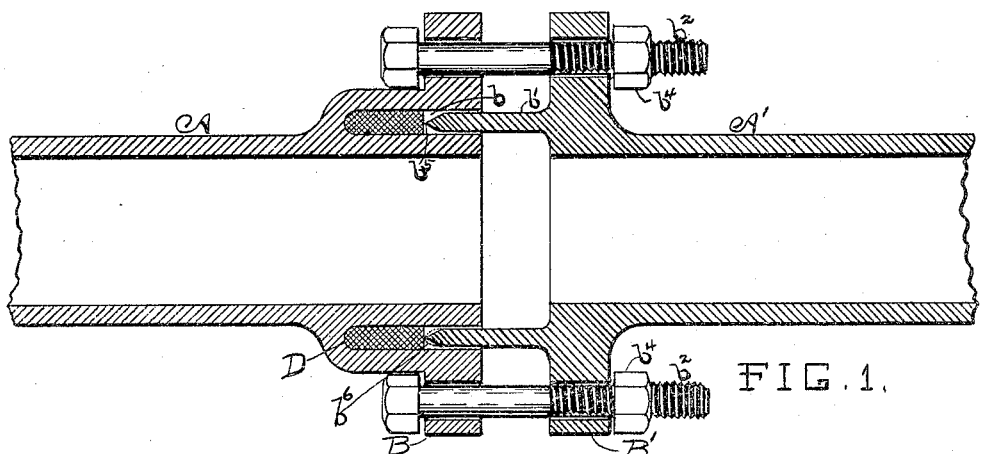
Figure 2:
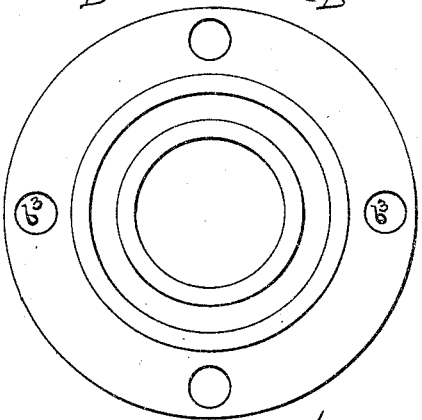
Figure 3:
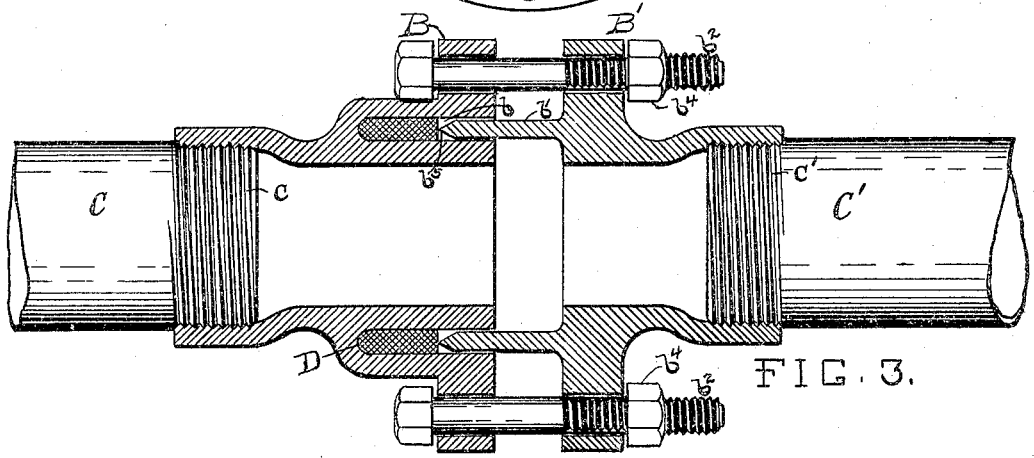

Figure 1 is a central lengthwise sectional elevation showing the ordinary construction of the joint as adapted to cast-metal pipes. Fig. 2 is an end elevation of the flanged end of the joint as shown in Fig. 1. Fig. 3 is a central lengthwise sectional elevation of the form of joint as made for attachment to wrought-metal pipe.

In Fig. 1, A represents a lengthwise central section of one end of a cast-metal pipe, and A' is the end of another similar pipe. Pipe A has a flange B, Figs. 1 and 2, and pipe A' has a similar flange B', the former being a part of the casting which forms the U-shaped pocket or recess $b$, into which the tongue or follower $b'$ fits, said tongue being cast as a part of flange B' and the latter, as well as the flange B, being part of the pipe-casting. Bolts $b^2$ in holes $b^3$ serve the purpose of drawing the said flanges together by means of nuts $b^4$. Recess $b$ is provided with suitable packing material D for making a tight joint when tongue $b'$ is forced down hard upon it by means of bolts $b^2$. I prefer to make this packing of woven asbestos or other durable fibrous material saturated with a water-repellent substance. The pocket $b$ and the depth of the packing in the pocket are made such that the packing shall have considerable resiliency, so as to insure a tight joint when the tongue recedes after being forced against the packing through expansion of the pipe-line by heat of liquid passing through it.

In Fig. 3, C and C' indicate two lengths of wrought-metal pipe to which the joint parts B B' are attached by screw-threads $c\ c'$ or in any equivalent manner. In this case the joint parts are the same as those shown in Figs. 1 and 2, with the exception that they are made as separate fittings, which are attached to the two lengths of pipe instead of being an integral part of the pipe.

In making up a joint in a line of pipe the packing material D is first inserted in pocket $b$, and then tongue $b'$ is introduced until the two-angled point $b^5$ touches the packing, after which the tongue is forced against it by screwing up nuts $b^4$ to the extent required to compress the packing sufficiently to insure a tight joint when the pipe is cold. By delivering a hot liquid through a completed pipe-line the linear expansion of the metal of the pipe will cause the joints to further close up by forcing the tongue $b'$ farther into packing D, and when the pipe cools and correspondingly contracts the tongue will recede and the packing must spring back and remain compressed against the tongue in order to maintain a tight joint. By making the depth of packing-box in medium size pipes about two inches at the outset and of somewhat springy material and anchoring the pipe-line at suitable intervals corresponding with the temperature which causes expansion the joints will remain permanently tight and the pipe-line will require no other expansion-joints. The two-angled end $b^5$ of tongue $b'$ compresses the packing sidewise on both sides, and thus aids in forcing the packing against the sides of recess $b$ and compressing it sufficiently to prevent leakage around the end of tongue $b'$.

Beveling the end of the tongue on both its inside and its outside edge secures a tight joint in first place more easily and one which will more surely remain tight than crowding the packing to only one side by making the bevel wholly on one side the tongue.

The bolted flanges B B', taken in connection with tongue $b'$, gives the joint great strength for resisting lateral strains.

I do not confine myself to the exact position of the flanges B B' as shown, inasmuch as locating them less near the end of pipes A A' will not prevent their intended use; but longer bolts will be needed.

As means of forcing the tongue $b'$ against packing D in pocket $b$ I do not confine myself to the flanges and bolts shown, as other means can be employed of drawing the flanges together, such as turnbuckles with bolts having heads or hooks engaging with lugs on the respective castings; but the flanges and bolts shown constitute efficient and convenient means of drawing the pipe ends together. The essential parts of my invention, therefore, are the U-shaped pocket $b$, packing D, tongue $b'$, and means for forcing said tongue against the packing to such extent as needful to form a tight joint.

The point of tongue $b'$ may be curved, as shown in dotted lines at $b^6$, Fig. 1, as a curve will suit some kinds of packing better than the straight-line sides.

What I claim as my invention, and desire to secure by Letters Patent, is—

1. An elastic pipe-joint consisting of a length of pipe having at its end a cast-metal flange provided with an annular pocket adapted for receiving a sufficient volume of elastic packing to allow by compression and expansion for necessary movement of the pipe while maintaining a tight joint, and including said packing, in combination with another length of pipe having a flange and provided with a tongue made to fit into the aforesaid pocket to form a tight joint by being compressed upon said packing, and means for drawing the two flanges together and forcing said tongue against the packing sufficiently to form a tight joint while allowing a predetermined amount of movement, substantially as set forth.

2. In a metallic pipe-joint having a flange at the end of a length of pipe and an annular pocket inside the circle of the flange adapted for receiving elastic packing, a volume of said packing sufficient to constantly maintain a tight joint while allowing a predetermined amount of movement of the pipe, another piece of pipe having at its end a flange and inside the circle of this flange a tongue made to fit into the aforesaid pocket, and means for drawing the two flanges together and compressing the tongue upon the packing, said tongue having a bevel on each side its center so that the packing shall be compressed both inside and outside of the tongue by wedging action of the tongue, essentially as shown and described.

CASSIUS CARROLL PECK.

Witnesses:
JAMES MALLEY,
WILLIAM W. WHITMORE.